(12) United States Patent
    Choi

(10) Patent No.: US 11,232,234 B2
(45) Date of Patent: Jan. 25, 2022

(54) METHOD FOR SHARING AND VERIFYING BLOCKS AND ELECTRONIC DOCUMENTS BETWEEN NODES IN BLOCKCHAIN

(71) Applicant: SWEMPIRE CO., LTD., Goyang-si (KR)

(72) Inventor: Myoung Soo Choi, Goyang-si (KR)

(73) Assignee: SWEMPIRE CO., LTD., Goyang-si (KR)

( * ) Notice: Subject to any disclaimer, the term of this patent is extended or adjusted under 35 U.S.C. 154(b) by 0 days.

(21) Appl. No.: 17/349,539

(22) Filed: Jun. 16, 2021

(65) Prior Publication Data

US 2021/0312088 A1     Oct. 7, 2021

Related U.S. Application Data

(63) Continuation of application No. PCT/KR2019/014749, filed on Nov. 1, 2019.

(30) Foreign Application Priority Data

Dec. 21, 2018  (KR) .................. 10-2018-0167815
Dec. 24, 2018  (KR) .................. 10-2018-0168117

(51) Int. Cl.
    *G06F 21/64*    (2013.01)
    *H04L 9/08*     (2006.01)
    *H04L 9/32*     (2006.01)

(52) U.S. Cl.
    CPC .............. *G06F 21/64* (2013.01); *H04L 9/088* (2013.01); *H04L 9/32* (2013.01)

(58) Field of Classification Search
    CPC ...... G06F 21/64; G06F 16/9024; G06F 21/60; G06F 21/62; H04L 9/088; H04L 9/32; H04L 2209/38; H04L 9/06; H04L 29/06; H04L 29/08; H04L 67/306; H04L 2209/805; H04L 63/0823; H04L 63/0861; H04L 63/0876; H04L 63/102; H04L 63/12; H04L 9/0825; H04L 9/3231; H04L 9/3239; H04L 9/3247; G06Q 40/00; G06Q 10/10; G06Q 10/06; G06Q 10/087; G06Q 10/20; G06Q 20/06; G06Q 20/10; G06Q 20/38; G06Q 20/3825; G06Q 20/3829;

(Continued)

(56) References Cited

U.S. PATENT DOCUMENTS

2018/0253464 A1*  9/2018  Kohli ..................... G06F 16/219
2020/0021598 A1*  1/2020  Lee ........................ H04L 63/102

(Continued)

FOREIGN PATENT DOCUMENTS

CN        108200203 A      6/2018
KR   10-2014-0049755 A    4/2014

(Continued)

OTHER PUBLICATIONS

International Search Report issued in PCT/KR2019/014749; dated Feb. 13, 2020.

*Primary Examiner* — Abiy Getachew
(74) *Attorney, Agent, or Firm* — Studebaker & Brackett PC

(57) ABSTRACT

Various embodiments of the present disclosure relate to a method for sharing and verifying blocks between specific nodes in a blockchain. In addition, various embodiments of the present disclosure relate to a method for distributing an electronic document using a smart contract in a blockchain.

12 Claims, 12 Drawing Sheets

(58) Field of Classification Search
CPC .............. G06Q 20/401; G06Q 2220/00; G06Q 30/0222; G06Q 30/0283; G06Q 30/04; G06Q 30/0601; G06Q 40/04; G06Q 40/12; G06Q 40/123; G06Q 40/125; G01C 15/04; G01S 19/14; G01S 19/35; G01S 19/48; H04W 4/021; H04W 12/041; H04W 12/069; H04W 12/71; H04W 12/72
See application file for complete search history.

(56) References Cited

U.S. PATENT DOCUMENTS

2021/0042744 A1* 2/2021 Zheng .................. H04L 9/0825
2021/0174343 A1* 6/2021 Aggarwal .............. G06Q 20/36

FOREIGN PATENT DOCUMENTS

| KR | 10-2015-0046941 A | 5/2015 |
| KR | 10-1701131 B1 | 2/2017 |
| KR | 10-1878869 B1 | 8/2018 |
| KR | 10-2018-0124545 A | 11/2018 |

* cited by examiner

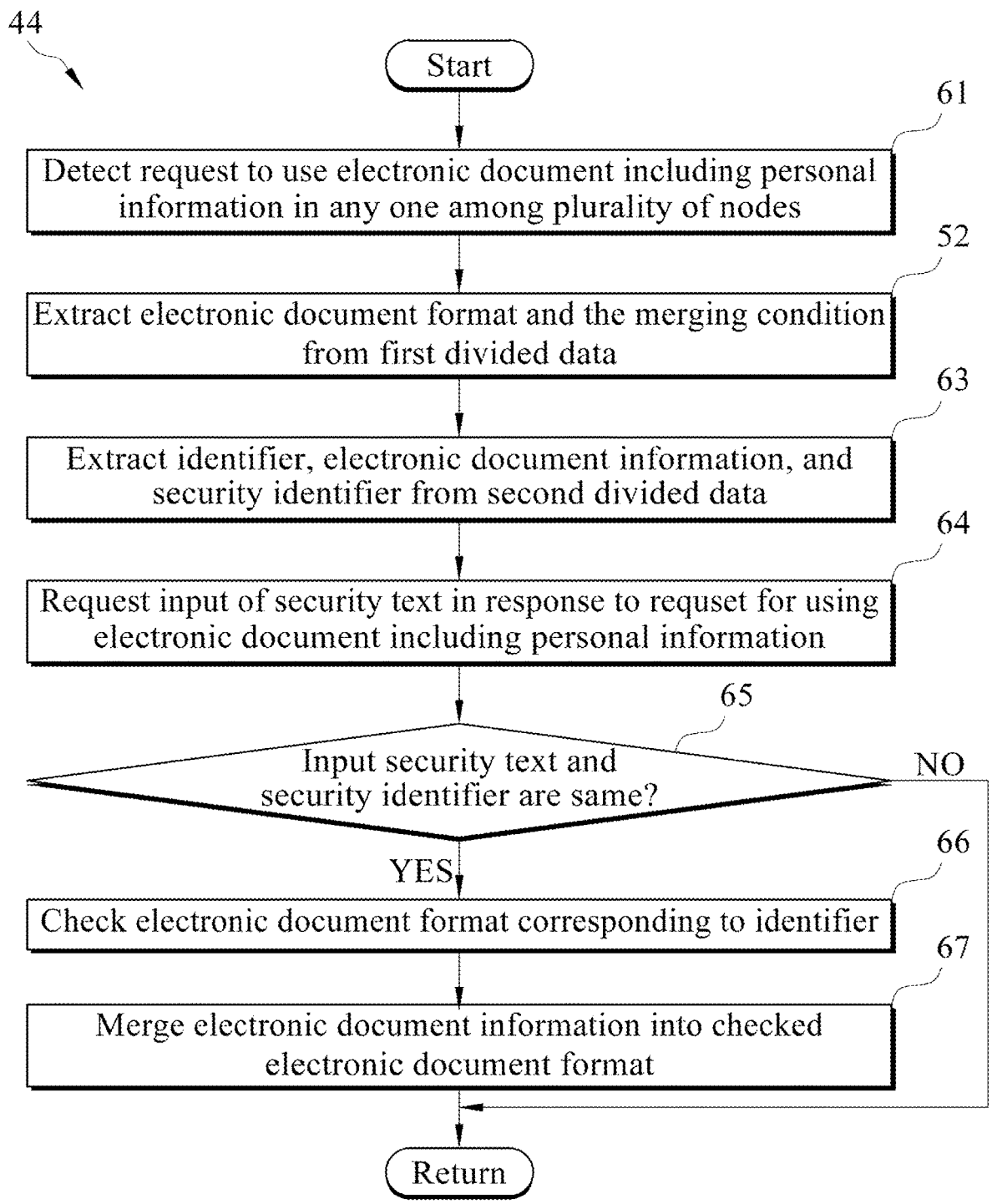

METHOD FOR SHARING AND VERIFYING BLOCKS AND ELECTRONIC DOCUMENTS BETWEEN NODES IN BLOCKCHAIN

CROSS-REFERENCE TO RELATED APPLICATION

The present application is a continuation of International Patent Application No. PCT/KR2019/014749, filed on Nov. 1, 2019, which is based upon and claims the benefit of priority to Korean Patent Application Nos. 10-2018-0167815 and 10-2018-0168117 filed on Dec. 21, 2018 and Dec. 24, 2018. The disclosures of the above-listed applications are hereby incorporated by reference herein in their entirety.

BACKGROUND

1. Technical Field

The present disclosure relates to a method for sharing and verifying blocks between specific nodes in a blockchain, and more particularly, to a method for efficiently sharing and verifying blocks between nodes without designating specific nodes to share blocks among a plurality of nodes included in a blockchain as a group.

In addition, the present disclosure relates to a method for distributing an electronic document using a smart contract in a blockchain, and more particularly, to a method for automatically merging an electronic document format and electronic document information at the time of using an electronic document in a blockchain.

2. Description of Related Art

A blockchain records continuously increasing data in blocks of a specific unit, and refers to a data management technology that allows each node constituting a peer-to-peer (P2P) network to manage blocks in a chain-like data structure or to data itself in the chain-like data structure. Here, the blockchain data having the chain-like data structure is operated in the form of a distributed ledger by each node without intervention of a central system.

The blockchain technique may be applied to various fields for the management of distributed data and the prevention of data forgery. For example, in the case in which the blockchain technique is applied to a financial field, even if there is no central financial institution that guarantees reliability, the transaction parties may make a safe transaction through the distributed ledger managed by each distributed blockchain node.

The blockchain can be divided into public and private blockchains. In particular, organizations with specific interests, such as financial sectors and corporations, prefer private blockchains that can only be accessed by authorized institutions instead of public blockchains. Accordingly, in the private blockchain, unlike the public blockchain, a method in which only specific nodes share specific blocks according to their interests is practiced among nodes participating in the blockchain.

For example, a method for sharing blocks between specific nodes was practiced by designating nodes to share blocks as a group in advance. However, when nodes to share blocks are designated as such in advance, there are three limitations in the aspect of using and operating a blockchain as follows.

As a first limitation, the group designation of the nodes to share blocks cannot be dynamically operated, so in order to add a new node to the previously designated group, a new group needs to be designated, so the number of groups to share the blocks increases unnecessarily. Therefore, management inefficiency increases as the number of groups increases.

As a second limitation, blocks stored and managed in a group of nodes sharing blocks are deleted when the group of nodes is released. Accordingly, after the group is deleted, it is necessary to separately store the managed blocks to continue queries, so there is inefficiency in the storage space in a plurality of nodes in a blockchain.

As a third limitation, blocks that only share nodes designated as a group cannot share other nodes, so the integrity of the blocks cannot be verified by all nodes participating in a blockchain, which lowers the overall reliability of the blockchain.

As described above, the blockchain technique shares reliable data and guarantees integrity, but there are limitations when it comes to distributing electronic documents.

As a first limitation, the size of blocks distributed and stored in the blockchain is limited in order to separate and distribute electronic documents in the form of files or electronic document formats and data.

As a second limitation, when electronic document files are stored in a blockchain, the overall blockchain capacity increases significantly, resulting in lower management efficiency.

As a third limitation, when only data of an electronic document is distributed, in order to view and inquire in the form of a document, the electronic document format needs to be received from an external system or the data of the electronic document needs be transmitted to the external system. Accordingly, it may be difficult to ensure the convenience of viewing and searching electronic documents and the reliability of formats. In addition, although various types of personal information exist in electronic documents such as certificates, it is difficult to protect such personal information.

SUMMARY OF THE INVENTION

The present disclosure has been devised to obviate the above limitations. An aspect of the present disclosure is directed to providing a method for sharing blocks by all nodes without designating a group in advance, wherein on the basis of identification information included in a block, specific nodes related to the block share blocks including transaction information, and the remaining nodes not related to the block share blocks including only a block header, such that the efficiency of management of all nodes in the blockchain is increased.

In addition, an aspect of the present disclosure is directed to providing a method for substantially increasing a storage space of the entire nodes of the blockchain by sharing only the block header shared only to specific nodes related to the block to the remaining nodes not related to the block.

In addition, an aspect of the present disclosure is directed to providing a method for verifying the integrity of blocks by all nodes participating in the blockchain, wherein the remaining nodes not related to the block verifies the integrity of blocks using a hash value included in the block and verifies the integrity of the transaction information not included in the block using a block hash value provided by a block generation node.

The present disclosure has been devised to obviate the above limitations. An aspect of the present disclosure is directed to providing a method for dividing electronic documents and including only electronic document information in a block for distribution.

In addition, an aspect of the present disclosure is directed to providing a method for automatically connecting and combining an electronic document format and data at the time of using an electronic document.

In addition, an aspect of the present disclosure is directed to providing a method for verifying a viewing qualification at the time of using an electronic document including personal information.

The aspects of the present disclosure are not limited to those mentioned above, and other aspects not mentioned will be clearly understood by those skilled in the art from the following description.

A method for sharing and verifying blocks between specific nodes in a blockchain according to an embodiment of the present disclosure may include: generating, with at least one first node among a plurality of nodes, at least one transaction including identification information and transaction information of the specific nodes; generating, with at least one second node among the plurality of nodes, at least one main block, including both a block header and a block body based on the identification information and the transaction information; generating, with at least one second node among the plurality of nodes, at least one sub-block, including only a block header based on the identification information and the transaction information; and differentially sharing, with the at least one second node, the generated at least one main block or sub-block with the specific nodes based on the identification information and the remaining nodes, except for the specific nodes.

A method for distributing an electronic document using a smart contract in a blockchain including a plurality of nodes according to an embodiment of the present disclosure may include: dividing the electronic document into first divided data, including an electronic document format and a merging condition and second divided data, including an identifier and electronic document information; distributing and storing the first divided data in the plurality of nodes; generating a block, including the second divided data and distributing and storing the generated block in the plurality of nodes; and merging the first divided data and the second divided data based on the merging condition and the identifier by any one node among the plurality of nodes. The plurality of nodes comprises an electronic document management and distribution module. The merging may include: detecting a request to use an electronic document in any one node among the plurality of nodes; extracting the electronic document format and the merging condition from the first divided data using the electronic document management and distribution module; extracting the identifier and the electronic document information from the second divided data using the electronic document management and distribution module; checking the electronic document format corresponding to the identifier using the electronic document management and distribution module; and merging the electronic document information into the checked electronic document format using the electronic document management and distribution module.

The plurality of nodes of a system for distributing an electronic document using a smart contract in a blockchain comprising the plurality of nodes according to an embodiment of the present disclosure may include an electronic document management and distribution module, an electronic document division module, a block generation module, and a memory. By using the electronic document division module, any one node among the plurality of nodes may divide the electronic document into first divided data, including an electronic document format and a merging condition and second divided data, including an identifier and electronic document information, and the any one node may distribute and store the first divided data in the plurality of nodes. By using the block generation module, any one node may generate a block, including the second divided data and distribute and store the generated block in the plurality of nodes. By using the electronic document management and distribution module, any one node among the plurality of nodes may merge the first divided data and the second divided data based on the merging condition and the identifier. The merging of the first divided data and the second divided data may be performed by: detecting a request to use an electronic document in any one node among the plurality of nodes; extracting the electronic document format and the merging condition from the first divided data using the electronic document management and distribution module; extracting the identifier and the electronic document information from the second divided data using the electronic document management and distribution module; checking the electronic document format corresponding to the identifier using the electronic document management and distribution module; and merging the electronic document information into the checked electronic document format using the electronic document management and distribution module.

According to an embodiment of the present disclosure, there may be the following various advantages.

According to an embodiment of the present disclosure, the block, including transaction is shared with specific nodes related to the block through identification information included in the block without designating a group in advance, and a sub-block including, only a block header is automatically shared with the remaining nodes not related to the block.

According to an embodiment of the present disclosure, a storage space of the entire nodes of the blockchain is substantially increased by sharing the block, including only a block header with the remaining nodes not related to the block.

In addition, according to an embodiment of the present disclosure, the integrity of blocks is verified by all nodes participating in the blockchain, using a hash value included in the block header shared with the remaining nodes and a block hash value provided by a block generation node.

In addition, according to an embodiment of the present disclosure, the degree of freedom in sharing blocks between specific nodes can be increased in a private blockchain.

According to an embodiment of the present disclosure, the size of data related to an electronic document stored in a block on a blockchain can be minimized by dividing and distributing the electronic document into an electronic document format and electronic document information.

In addition, according to an embodiment of the present disclosure, it is possible to automatically merge an electronic document format and electronic document information at the time when a document is used using an electronic document management and distribution module, and to provide an electronic document.

In addition, according to an embodiment of the present disclosure, it is possible to increase the reliability of an electronic document distributed in a blockchain by providing a method for verifying qualification conditions when viewing and verifying an electronic document including personal information.

BRIEF DESCRIPTION OF THE DRAWINGS

FIG. 14 is a flowchart illustrating a method of merging electronic documents including personal information in a blockchain according to an embodiment of the present disclosure.

DETAILED DESCRIPTION

Figure 1:
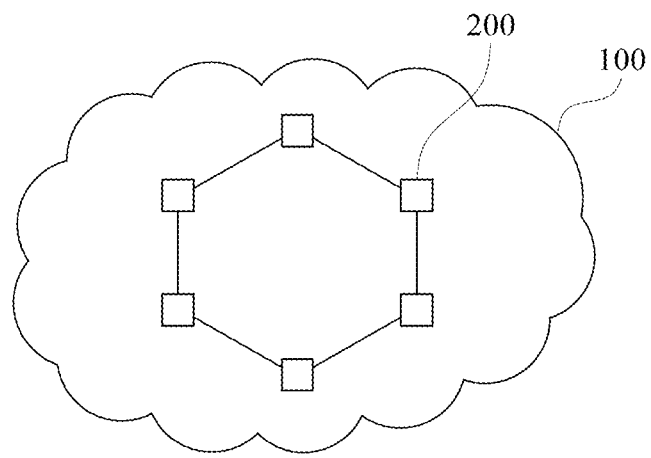
FIG. 1 is a block diagram illustrating a blockchain system of the present disclosure.

Hereinafter, preferred embodiments of the present disclosure will be described in detail with reference to the accompanying drawings. Advantages and features of the present disclosure and methods for achieving them will be apparent from the embodiments described below in detail in conjunction with the accompanying drawings. However, the present disclosure is not limited to the embodiments disclosed below, but may be implemented in various different forms. The embodiments are provided so that this disclosure will be thorough and complete and will fully convey the scope of the present disclosure to those skilled in the technical field to which the present disclosure pertains. It is to be noted that the scope of the present disclosure is defined only by the claims. Like reference numerals designate like components throughout the specification.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

The terminology used herein is for the purpose of describing embodiments and is not intended to limit the present disclosure. As used herein, the singular may be intended to include the plural forms as well, unless the context clearly indicates otherwise. The terms "comprises" and/or "comprising" used herein do not preclude the presence or addition of one or more other components, in addition to the mentioned components.

<Method for Sharing and Verifying Blocks Between Specific Nodes in a Blockchain>

FIG. 1 is a block diagram illustrating a blockchain system of the present disclosure.

Referring to FIG. 1, the blockchain system may be a decentralized network 100 system composed of a plurality of nodes 200. The nodes 200 configuring the decentralized network 100 may be electronic devices having an arithmetic function, a communication function, and a storage function such as a computer, a server, and a mobile terminal.

In an embodiment, the decentralized network 100 may store and refer to information commonly known to all participating nodes in a connection bundle of blocks called a blockchain. The plurality of nodes 200 may be divided into a full node that enables mutual communication and is responsible for storing, managing and disseminating a blockchain, and a light node that can only participate in a simple transaction. In the present specification, when a node is referred to without further explanation, it is often referred to as a full node participating in the decentralized network 100 and performs an operation of generating, storing, or verifying a blockchain, but is not limited thereto.

In an embodiment, each block connected to the blockchain includes transaction details, that is, transactions within a certain period of time. The nodes 200 manage transactions by generating, storing, or verifying a blockchain according to their respective roles.

In an embodiment, a transaction may represent various types of transactions. For example, a transaction may correspond to a financial transaction to indicate the ownership of virtual currency and its fluctuations. In addition, in another example, a transaction may correspond to a cash transaction to indicate the ownership of an object and its fluctuations. The nodes that perform transactions in the decentralized network 100 may have a private key and a public key pair each having a cryptographic association relation.

In an embodiment, the present disclosure may be applied in a public blockchain as described above.

In another embodiment, the present disclosure may be a private blockchain. For example, in the private blockchain, only authorized institutions can view in terms of read permission, only nodes corresponding to authorized institutions and supervisory institutions can perform transaction verification and approval in terms of transaction verification and approval, and only institutions that are legally responsible for transactions can create transactions. However, the private blockchain applied to the present disclosure is not limited to the above-described contents, and may mean all blockchains in which only specific groups sharing a specific interest can participate.

In an embodiment, when the present disclosure is applied to a private blockchain, there may be a designated node that performs transaction verification, approval, and management.

Figure 4:
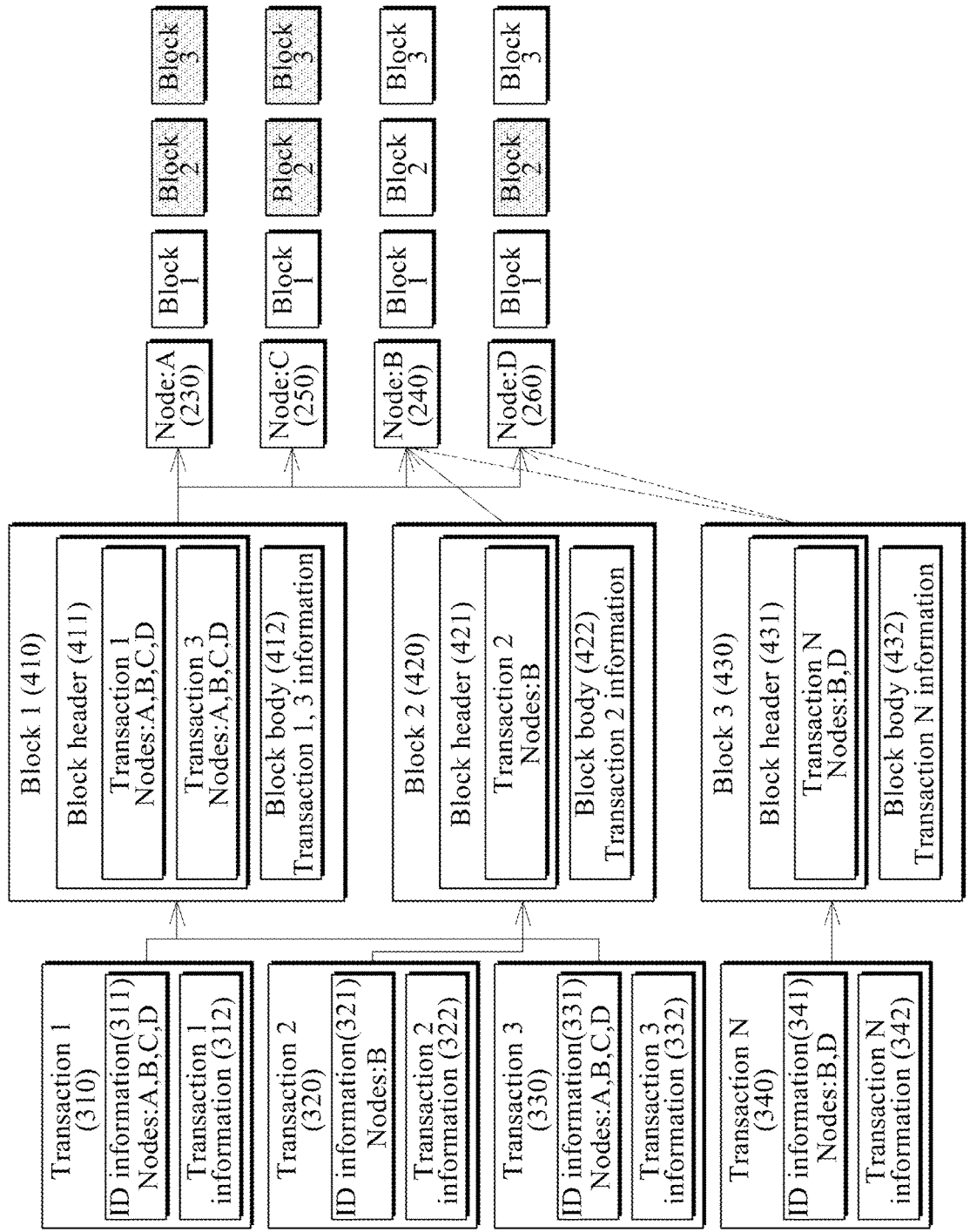
FIG. 4 is an exemplary diagram illustrating a method for sharing blocks between specific nodes in a blockchain according to an embodiment of the present disclosure.

In an embodiment, the blockchain described in the present disclosure may be a kind of distributed database of one or more blocks sequentially connected. Blockchain is used to store and manage the transaction details of users in a blockchain system, and each node participating in the blockchain network 100 generates a block and connects the same to the blockchain. For example, blocks 1 to 3 illustrated in FIG. 4 to be described later may be a portion of blocks of a blockchain that are sequentially connected. Although a limited number of blocks are shown in FIG. 4, the number of blocks that may be included in the blockchain is not limited thereto.

Figure 2:
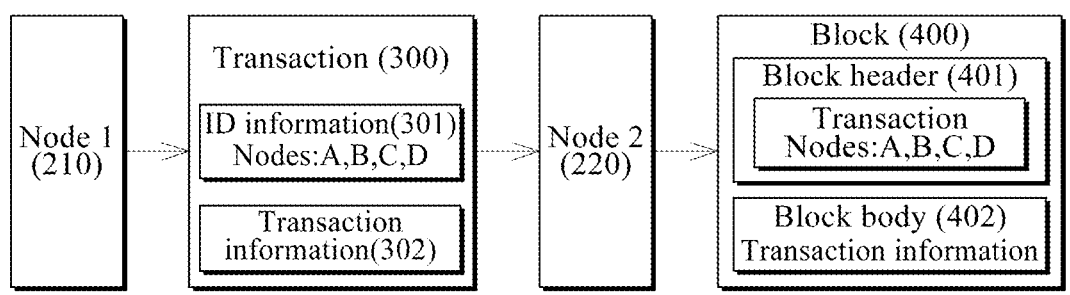
FIG. 2 is a block diagram illustrating a method for sharing blocks between specific nodes in a blockchain according to an embodiment of the present disclosure.

FIG. 2 is a block diagram illustrating a method for sharing blocks between specific nodes in a blockchain according to an embodiment of the present disclosure.

Referring to FIG. 2, in a method for sharing blocks between specific nodes in a blockchain according to an embodiment of the present disclosure, a first node 210 may generate a transaction 300, and a second node 220 may generate a block 400 including a transaction 300.

In an embodiment, the first node 210 may be a node that proposes and generates the transaction 300. The first node 210 may be a node having the authority to generate the transaction 300 among the plurality of nodes 200, and there may be a plurality of first nodes 210. On the other hand, there is no separate authority to generate the transaction 300, and all nodes 200 included in the blockchain network 100 of the present disclosure may generate the transaction 300.

In an embodiment, the transaction 300 may include identification information 301 and transaction information 302 of specific nodes. For example, the identification information 301 may be a tag that may check a node that may share the corresponding transaction information 302. For example, as illustrated in FIG. 2, when A, B, C, and D are included in the identification information 301, this means that the nodes to share the transaction information are node A, node B, node C, and node D. For example, the transaction information 302 may be information related to various types of transactions.

In an embodiment, the second node 220 may be a node that generates the block 400. The second node 220 may be a node having the authority to generate the block 400 among the plurality of nodes 200, and there may be a plurality of second nodes 220. On the other hand, there is no separate authority to generate the block 400, and all nodes 200 included in the blockchain network 100 of the present disclosure may generate a transaction.

In an embodiment, each block 400 included in a blockchain may be configured to include a block header 401 and a block body 213. The block header 401 may include a hash value of a previous block to indicate a connection relation between blocks. In the process of verifying whether the blockchain is valid, the connection relation in the block header 401 may be used. The block body 402 may include data stored and managed in the block 400, for example, transaction information 302, a transaction list, or a transaction chain.

In an embodiment, the block header 401 may include identification information of specific nodes to share the block 400 (for example, nodes A, B, C, D), a hash value of the previous block, a hash value of the current block, and a nonce. In addition, the block header 401 may include a hash value representing the transaction information 302 in the block 400.

In an embodiment, the blockchain may include a plurality of connected blocks. A plurality of blocks may be connected based on a hash value in the block header 401. A hash value for the block immediately preceding the hash value of the previous block included in the block header 401 may be the same value as the current hash value included in the previous block. A plurality of blocks may be connected in a chain by a hash value of a previous block in each block header. The nodes 200 participating in the decentralized network 100 verify the validity of the block based on the hash value of the previous block included in one or more blocks, and thus it may be impossible for a single malicious node to forge or alter the contents of an already generated block.

In an embodiment, the block body 402 may include transaction information 302, a transaction list, or a transaction chain. The transaction information 302 may be information related to a transaction generated in the transaction 300. The transaction list may be a list of blockchain-based transactions. For example, the transaction list may contain records of financial transactions made in a blockchain-based financial system. The transaction list may be expressed in the form of a tree. For example, the amount transmitted by user A to user B is recorded in the form of a list, and the storage length in the block may be increased or decreased based on the number of transactions included in the current block.

According to an embodiment of the present disclosure, unlike FIG. 2, the first node 210 and the second node 220 may be the same node. In other words, the node generating the transaction 300 and generating the block 400 may be the same. In the following, for the convenience of explanation, the first node 210 and the second node 220 are separately described, but unlike as illustrated in FIGS. 3 to 8 below, the same node may generate the transaction 300, generate the block 400, and share the generated block 400 and verify the block 400.

Figure 3:
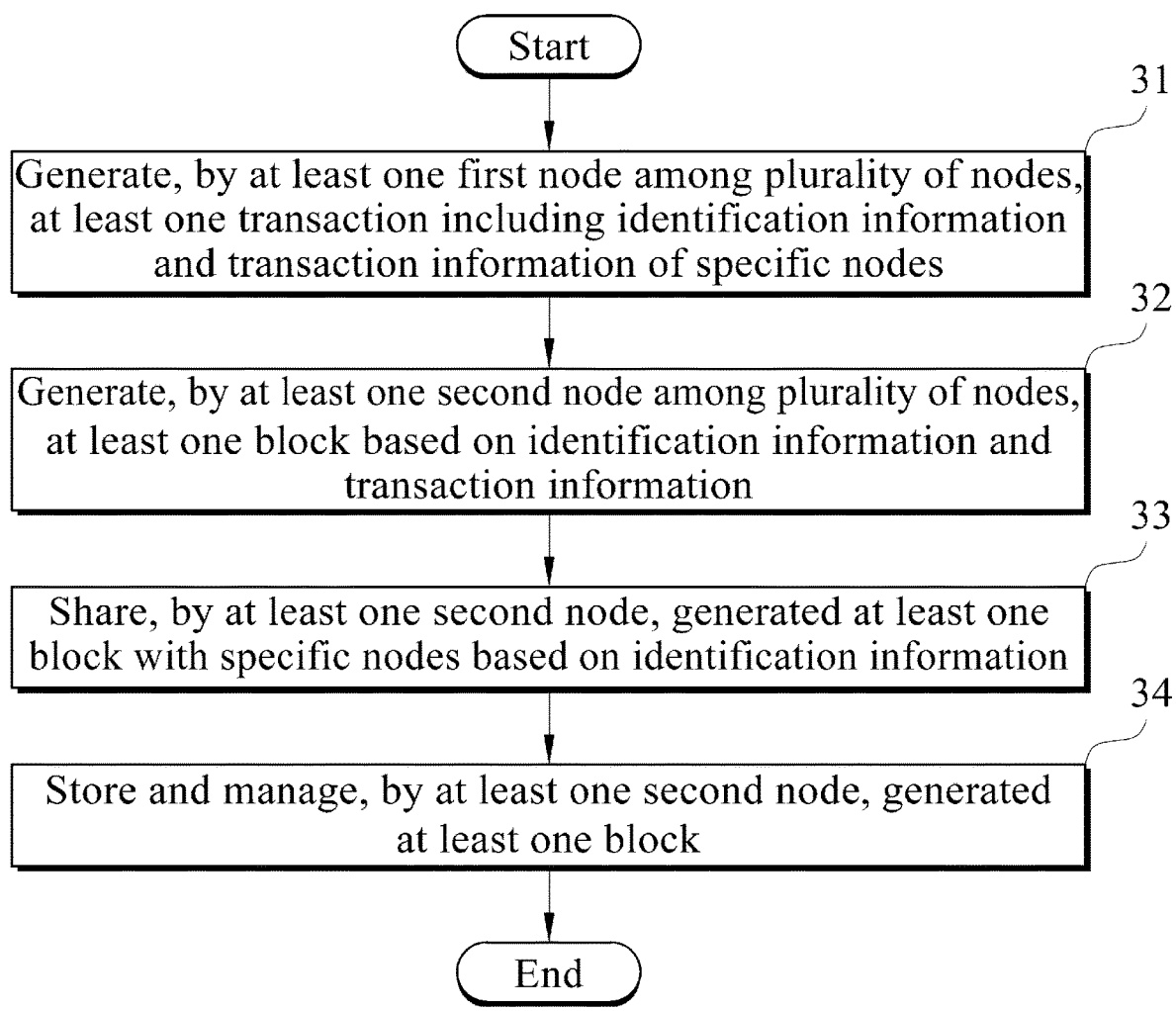
FIG. 3 is a flowchart illustrating a method for sharing blocks between specific nodes in a blockchain according to an embodiment of the present disclosure.

FIG. 3 is a flowchart illustrating a method for sharing blocks between specific nodes in a blockchain according to an embodiment of the present disclosure. FIG. 4 is an exemplary diagram illustrating a method for sharing blocks between specific nodes in a blockchain according to an embodiment of the present disclosure. The operations of FIG. 3 may be performed by the first node 210 and the second node 220 illustrated in FIG. 2. Block 1 410, block 2 420, and block 3 430 illustrated in FIG. 4 may have a sequentially connected blockchain structure.

For the convenience of explanation, specific nodes to be described below are nodes related to the generated block and may be understood as nodes that share a block, including both a block header and a block body (transaction information), and the remaining nodes may be understood as nodes that share a sub-block, including only a block header as nodes not related to the generated block.

Referring to FIGS. 3 and 4, in an embodiment, in operation 31, at least one first node 210 among the plurality of nodes 200 may generate at least one transaction including identification information and transaction information of specific nodes. Herein, the at least one first node 210 may be a concept including all of a single node or a plurality of nodes. In the following, the configurations modified by "at least one" may be understood as a concept including a single or plural form. For example, as illustrated in FIG. 4, at least one first node 210 may generate a transaction 1 310, a transaction 2 320, a transaction 3 330, and a transaction N 340. Each of the transactions may generate one first node 210 or generate a plurality of first nodes 210, respectively. The transaction 1 310 may include identification information 311 (nodes: A, B, C, D) and transaction 1 information 312 of specific nodes. The transaction 2 320 may include identification information 321 (node: B) and transaction 2 information 322 of specific nodes. Transaction 3 330 may include identification information 331 (nodes: A, B, C, D) and transaction 3 information 332 of specific nodes. The transaction N 340 may include identification information 341 (nodes: B, D) and transaction N information 342 of specific nodes. Here, the number of transactions disclosed in FIG. 4 is exemplary for the convenience of explanation, and the number of transactions may be variously modified.

In an embodiment, in operation 32, the at least one second node 220 among the plurality of nodes 200 may generate at least one block based on identification information and transaction information. For example, the at least one second node 200 may generate block 1 410, block 2 420, and block 3 430. Each of the blocks may generate one second node 220 or generate a plurality of second nodes 220, respectively. For example, the block 2 (420) may be generated based on the identification information 321 (node: B) of the transaction 2 320 and the transaction 2 information 322, and may be composed of a block header 421 including the identification information 321 (node: B) and the block body 422 including the transaction 2 information 322. In addition, the block 3 430 may be generated based on the identification information 341 (nodes: B, D) of transaction N 340 and transaction N information 342, and may be composed of the block header 431 including the identification information 341 (nodes: B, D) and the block body 432 including the transaction N information 342. A detailed description of the generation of block 1 410 will be described later with reference to FIG. 5. Herein, the number of blocks illustrated in FIG. 4 is exemplary for the convenience of explanation, and the number of blocks may be variously modified.

In an embodiment, in operation 33, at least one block generated with the at least one second node 220 may be shared with specific nodes based on the identification information. For example, the at least one second node 220 may share the block 2 420 with the node B 240 based on the identification information 321 (node: B) included in the block header 421. In addition, the at least one second node 220 may be shared with the block 3 430 with the node B 240 and the node D 260 based on the identification information 341 (nodes: B, D) included in the block header 431. A detailed description of the sharing of the block 1 410 will be described later with reference to FIG. 5.

In an embodiment, block 2 420 may also be shared with node A 230, node C 250, and node D 260, and block 3 430 may also be shared with node A 230 and node C 250. A detailed description of the remaining nodes sharing blocks except specific nodes will be described later with reference to FIG. 6.

In an embodiment, in operation 34, the at least one second node 220 may store and manage the generated at least one block. For example, at least one second node 220 having generated the blocks 410, 420, and 430 may store and manage the blocks 410, 420, and 430 as a whole. A description of a method for verifying blocks will be described later with reference to FIG. 8.

As such, in the present disclosure, the generated block may be shared by all nodes, but the block, including transaction information may be shared only to specific nodes related to the block based on the identification information.

According to an embodiment of the present disclosure, unlike illustrated in the drawings, the first node 210 and the second node 220 may be the same node.

Figure 5:
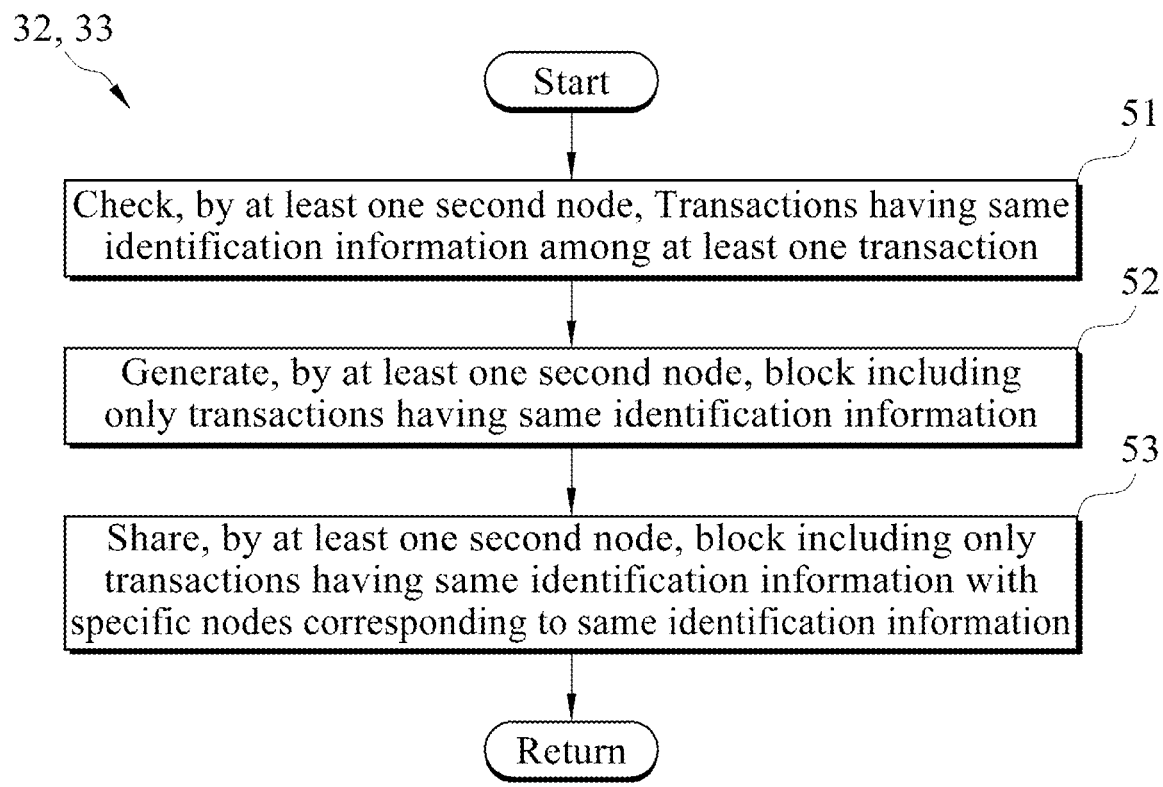
FIG. 5 is a flowchart illustrating a method of generating a block using identification information and sharing the same with specific nodes according to an embodiment of the present disclosure.

FIG. 5 is a flowchart illustrating a method of generating a block using identification information and sharing the same with specific nodes according to an embodiment of the present disclosure. The operations of FIG. 5 may be operations in which operations 32 and 33 of FIG. 3 are embodied. The operations of FIG. 5 may be performed by the first node 210 and the second node 220 illustrated in FIG. 2. Block 1 410, block 2 420, and block 3 430 illustrated in FIG. 4 may have a sequentially connected blockchain structure.

Referring to FIGS. 4 and 5, in an embodiment, in operation 51, the at least one second node 220 may check transactions having the same identification information among at least one transaction. For example, as illustrated in FIG. 4, the at least one second node 220 may check a transaction 1 310 having identification information 311 (nodes: A, B, C, D) and a transaction 3 330 having identification information 331 (nodes: A, B, C, D). In other words, the at least one second node 220 may check that the transaction 1 310 and the transaction 3 330 have nodes: A, B, C, and D as the same identification information.

In an embodiment, in operation 52, the at least one second node 220 may generate a block, including only transactions having the same identification information. For example, the at least one second node 220 may generate block 1 410. For example, block 1 410 may be composed of a block header 411 including identification information 311 (nodes: A, B, C, D) and identification information 331 (nodes: A, B, C, D) and a block body 412 including transaction 1 information 312 and transaction 3 information 332.

In an embodiment, in operation 53, the at least one second node 220 may share a block, including only transactions having the same identification information with specific nodes corresponding to the same identification information. For example, the at least one second node 220 may share the block 410 with node A 230, node B 240, node C 250, and node D 260 according to the identification information 311, 331.

According to an embodiment of the present disclosure, unlike illustrated in the drawings, the first node 210 and the second node 220 may be the same node.

Figure 6:
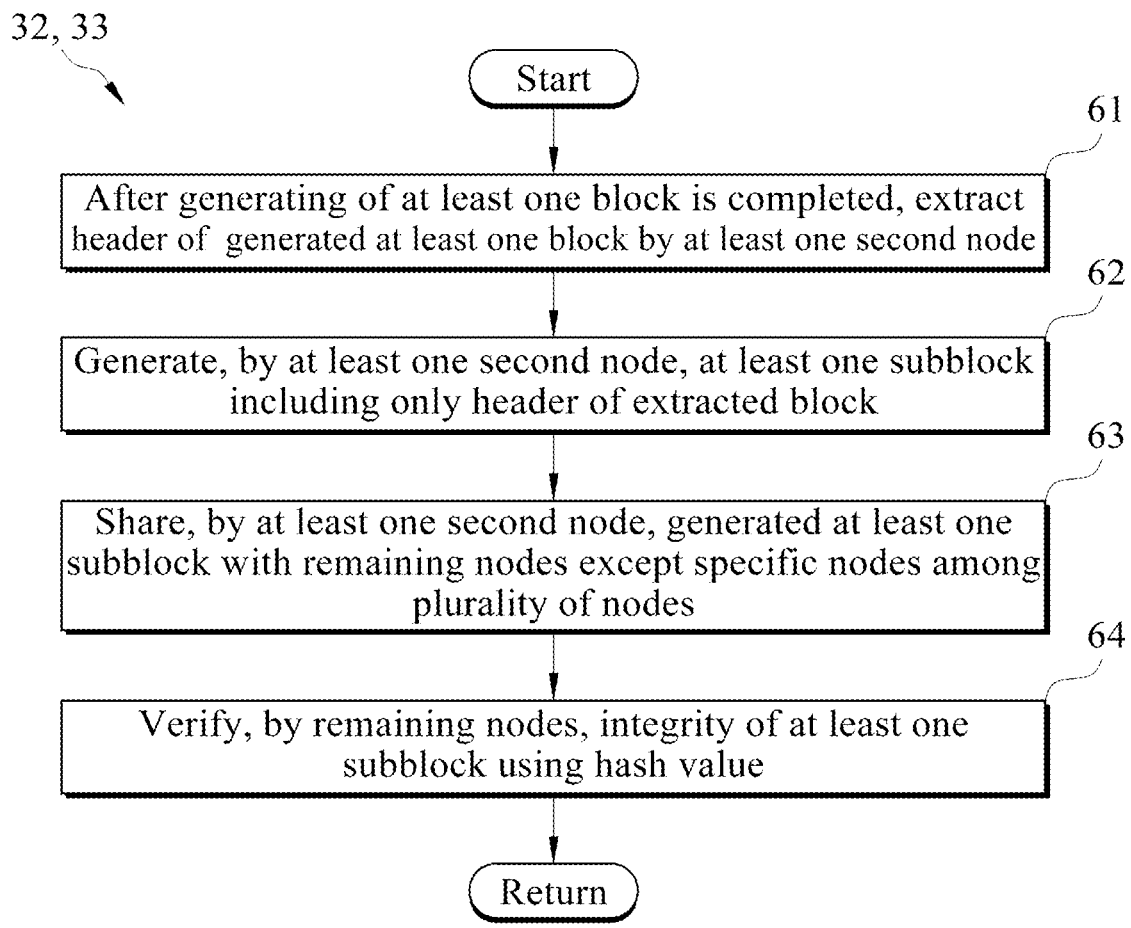
FIG. 6 is a flowchart illustrating a method of generating and sharing sub-blocks according to an embodiment of the present disclosure.
Figure 7:
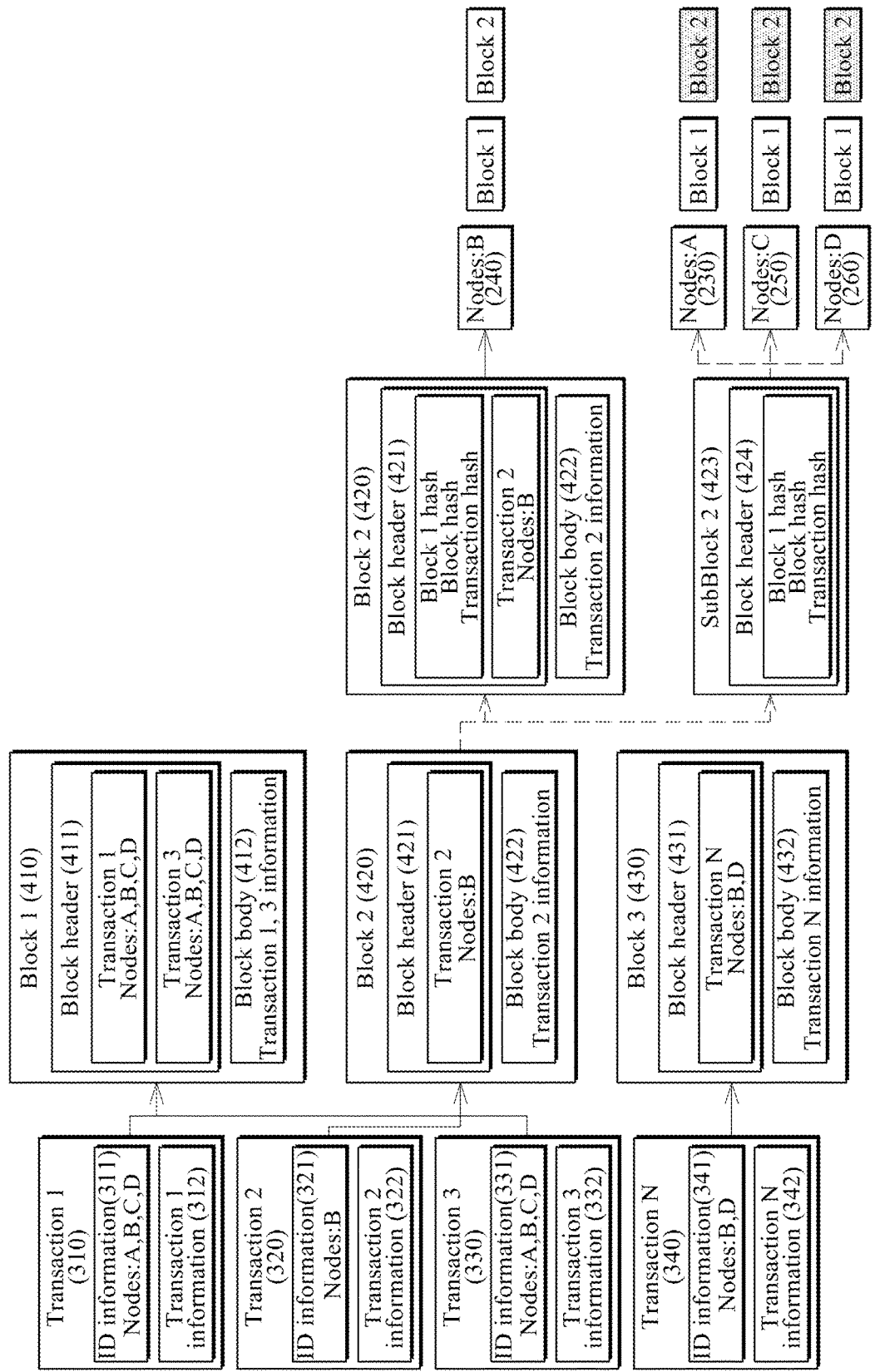
FIG. 7 is an exemplary diagram illustrating a method of generating and sharing sub-blocks according to an embodiment of the present disclosure.

FIG. 6 is a flowchart illustrating a method of generating and sharing sub-blocks according to an embodiment of the present disclosure. FIG. 7 is an exemplary diagram illustrating a method of generating and sharing sub-blocks according to an embodiment of the present disclosure. The operations of FIG. 6 may be operations in which operations 32 and 33 of FIG. 3 are embodied. The operations of FIG. 6 may be performed by the first node 210 and the second node 220 illustrated in FIG. 2. Block 1 410, block 2 420, and block 3 430 illustrated in FIG. 7 may have a sequentially connected blockchain structure.

Referring to FIGS. 6 and 7, in an embodiment, in operation 61, after the generating at least one block is completed, at least one block header generated with the at least one second node 220 may be extracted. For example, as illustrated in FIG. 7, after the at least one second node 220 completes the generation of block 2 420, the block header 424 may be extracted from the block 2 420. For example, the block header 424 may include a hash value of a previous block (for example, block 1 hash value), a hash value of a current block, and a transaction hash value.

In an embodiment, in operation 62, at least one sub-block, including only the block header extracted with the at least one second node 220 may be generated. Herein, the sub-block may be a block maintaining the sameness as an already generated block, but includes only the block header. For example, the at least one second node 220 may generate sub-block 2 423 including only the block header 424. Herein, the block header 424 may include remaining information excluding only the identification information 321 from the block header 421 as illustrated in FIG. 6. On the contrary, the block header 424 may be the same as the block header 421 of the block 2 420. In other words, the sub-block 2 423 may be a block maintaining the sameness as the block 2 420 but includes only the block header 424.

In an embodiment, in operation 63, at least one sub-block generated with the at least one second node 220 may be shared with other nodes of the plurality of nodes 200 except for specific nodes. For example, the at least one second node 220 may share the sub-block 2 423 with the node A 230, the node C 250, and the node D 260.

In an embodiment, in operation 64, the remaining nodes may verify the integrity of at least one sub-block using a block hash value. A detailed description of verifying the integrity of the sub-block will be described later with reference to FIG. 8.

In an embodiment, block 3 430 illustrated in FIG. 4 may also be shared with the remaining nodes in the same manner as the method for sharing the sub-block 2 423 of block 2 420 illustrated in FIG. 6. In other words, sub-block 3 of block 3 430 may be shared with node A 230 and node C 250 with only the block header extracted from the block 3 430.

As such, in the present disclosure, the generated block is shared by all nodes as illustrated in FIG. 4, but specific nodes share a full block, including transaction information, and the remaining nodes share a sub-block, including only a block header. By operating in this manner, the present disclosure can increase the management efficiency of blocks without designating a separate group.

According to an embodiment of the present disclosure, unlike illustrated in the drawings, the first node 210 and 210 and the second node 220 and 220 may be the same node.

Figure 8:
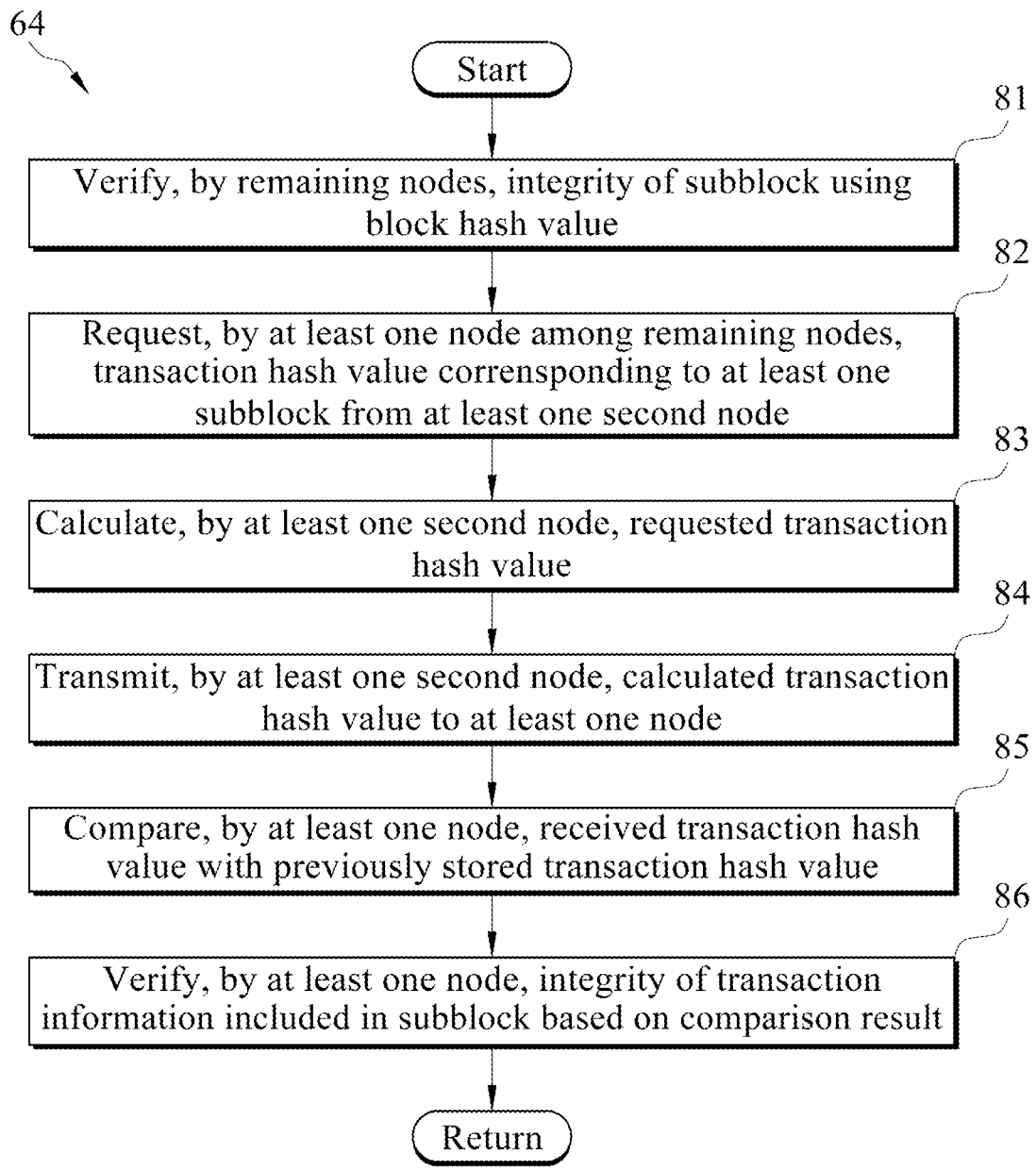
FIG. 8 is a flowchart illustrating a method for verifying the integrity of sub-blocks and transaction information according to an embodiment of the present disclosure.

FIG. 8 is a flowchart illustrating a method for verifying the integrity of sub-blocks and transaction information according to an embodiment of the present disclosure. The operations of FIG. 8 may be operations in which operation 64 of FIG. 6 are embodied. The operations of FIG. 8 may be performed by the first node 210 and the second node 220 illustrated in FIG. 2.

In an embodiment, a method for verifying the integrity of blocks without a block header shared with the remaining nodes may be performed in two operations. The first operation is configured to conduct a verification using a hash value included in a block, and the second operation is configured to verify the integrity of the transaction not included in the block.

Referring to FIGS. 7 and 8, in an embodiment, in operation 81, the remaining nodes may verify the integrity of a sub-block using a block hash value. For example, node A 230, node C 250, and node D 260 use the block hash value (the hash value of the previous block, the hash value of the current block) included in the sub-block 2 423 so that the integrity of sub-block 2 may be verified.

In an embodiment, in operation 82, at least one of the remaining nodes may request the at least one second node 220 for a transaction hash value corresponding to the at least one sub-block. For example, at least one node among node A 230, node C 250, and node D 260 may request the at least one second node 220 for a transaction hash value corresponding to the sub-block 2 423. Herein, the second node 220 may be a node that generates, stores, and manages the block 2 420.

In an embodiment, in operation 83, a transaction hash value requested with the at least one second node 220 may be calculated. For example, the at least one second node 220 may calculate the requested transaction hash value based on the transaction hash value stored in the block head 421 of block 2 420.

In an embodiment, in operation 84, the transaction hash value calculated with the at least one second node 220 may be transmitted to the at least one node. For example, the at least one second node 220 may transmit the calculated transaction hash value to the node that makes the request among the node A 230, the node C 250, and the node D 260.

In an embodiment, in operation 85, a transaction hash value that at least one node receives may be compared with a previously stored transaction hash value. For example, at least one node among node A 230, node C 250, and node D 260 may compare the received transaction hash value with the previously stored transaction hash value included in the sub-block 2 423.

In an embodiment, in operation 86, at least one node may verify the integrity of transaction information included in a sub-block based on the comparison result. For example, at least one node among the node A 230, the node C 250, and the node D 260 may verify the integrity of transaction information included in the sub-block 2 423.

According to an embodiment of the present disclosure, the plurality of nodes 200 may store and manage at least one block and at least one sub-block as the same block.

According to an embodiment of the present disclosure, unlike illustrated in the drawings, the first node 210 and 210 and the second node 220 and 220 may be the same node.

A method for sharing and verifying blocks between specific nodes in a blockchain according to an embodiment of the present disclosure may include: generating, with at least one first node among a plurality of nodes, at least one transaction including identification information and transaction information of the specific nodes; generating, with at least one second node among the plurality of nodes, at least one block based on the identification information and the transaction information; and sharing, with the at least one second node, the generated at least one block with the specific nodes based on the identification information.

According to various embodiments of the present disclosure, the generating of the at least one block may include: checking, with the at least one second node, transactions having the same identification information among the at least one transaction; generating, with the at least one second node, a block, including only transactions having the same identification information; and sharing, with the at least one second node, the block, including only transactions having the same identification information with specific nodes corresponding to the same identification information.

According to various embodiments of the present disclosure, the method may further include storing and managing, with the at least one second node, the generated at least one block.

According to various embodiments of the present disclosure, the generating of the at least one block may include: after the generating of the at least one block is completed, extracting a header of the generated at least one block with the at least one second node; and generating, with the at least one second node, at least one sub-block, including only the header of the extracted block.

According to various embodiments, the sharing of the block with the specific nodes may further include sharing, with the at least one second node, the generated at least one sub-block with the remaining nodes, except for the specific nodes, among the plurality of nodes.

According to various embodiments, the at least one sub-block may include a block hash value, and the method may further include verifying, with the remaining nodes, the integrity of the at least one sub-block using the block hash value.

According to various embodiments, the method may further include: requesting, with at least one node among the remaining nodes, a transaction hash value corresponding to the at least one sub-block from the at least one second node; calculating, with the at least one second node, the requested transaction hash value; transmitting, with the at least one second node, the calculated transaction hash value to the at least one node; and comparing the received transaction hash value to the at least one node; and comparing, with the at least one node, the received transaction hash value with the previously stored transaction hash value.

According to various embodiments, the method may further include verifying, with the at least one node, the integrity of the transaction information included in the sub-block based on the comparison result.

According to various embodiments, the method may further include storing and managing, with the plurality of nodes, the at least one block and the at least one sub-block as the same block.

A system for sharing and verifying blocks between specific nodes in a blockchain according to an embodiment of the present disclosure may include a plurality of nodes configuring a blockchain network, wherein at least one first node among the plurality of nodes may generate at least one transaction including identification information and transaction information of the specific nodes, at least one second node among the plurality of nodes may generate at least one block based on the identification information and the transaction information, and the at least one second node may share the generated at least one block with the specific nodes based on the identification information.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

<Method for Distributing an Electronic Document Using a Smart Contract in a Blockchain>

Figure 9:
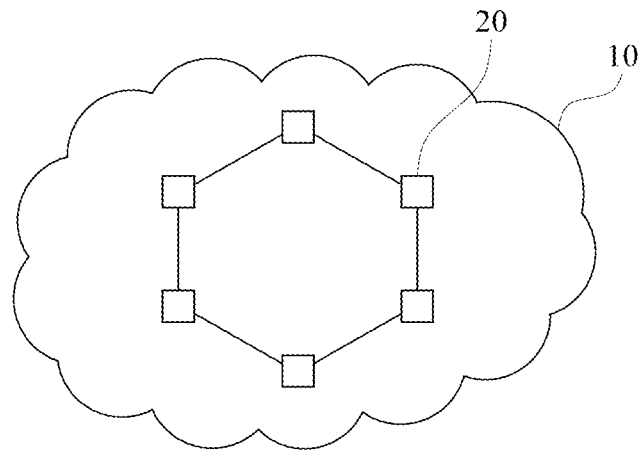
FIG. 9 is a block diagram illustrating a blockchain system of the present disclosure.

FIG. 9 is a block diagram illustrating a blockchain system of the present disclosure.

Referring to FIG. 9, the blockchain system may be a decentralized network 10 system composed of a plurality of nodes 20. The nodes 20 configuring the decentralized network 10 may be electronic devices having an arithmetic function, a communication function, and a storage function such as a computer, a server, and a mobile terminal.

In an embodiment, the decentralized network 10 may store and refer to information commonly known to all participating nodes in a connection bundle of blocks called a blockchain. The plurality of nodes 200 may be divided into a full node that enables mutual communication and is responsible for storing, managing and disseminating a blockchain, and a light node that can only participate in a simple transaction. In the present specification, when a node is referred to without further explanation, it is often referred to as a full node participating in the decentralized network 10 and performs an operation of generating, storing, or verifying a blockchain, but is not limited thereto.

Figure 10:
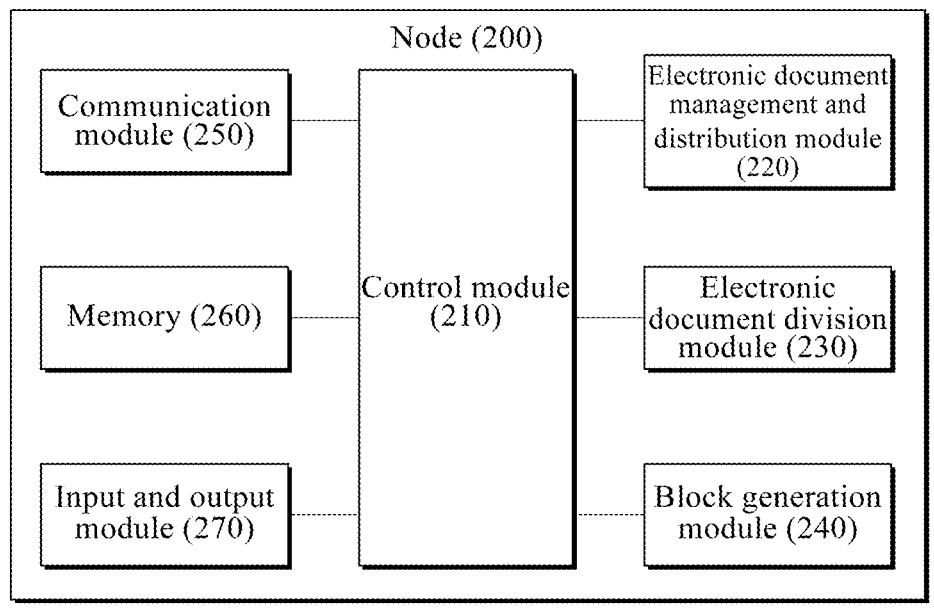
FIG. 10 is a block diagram illustrating a plurality of nodes of the blockchain system of the present disclosure.
Figure 11:
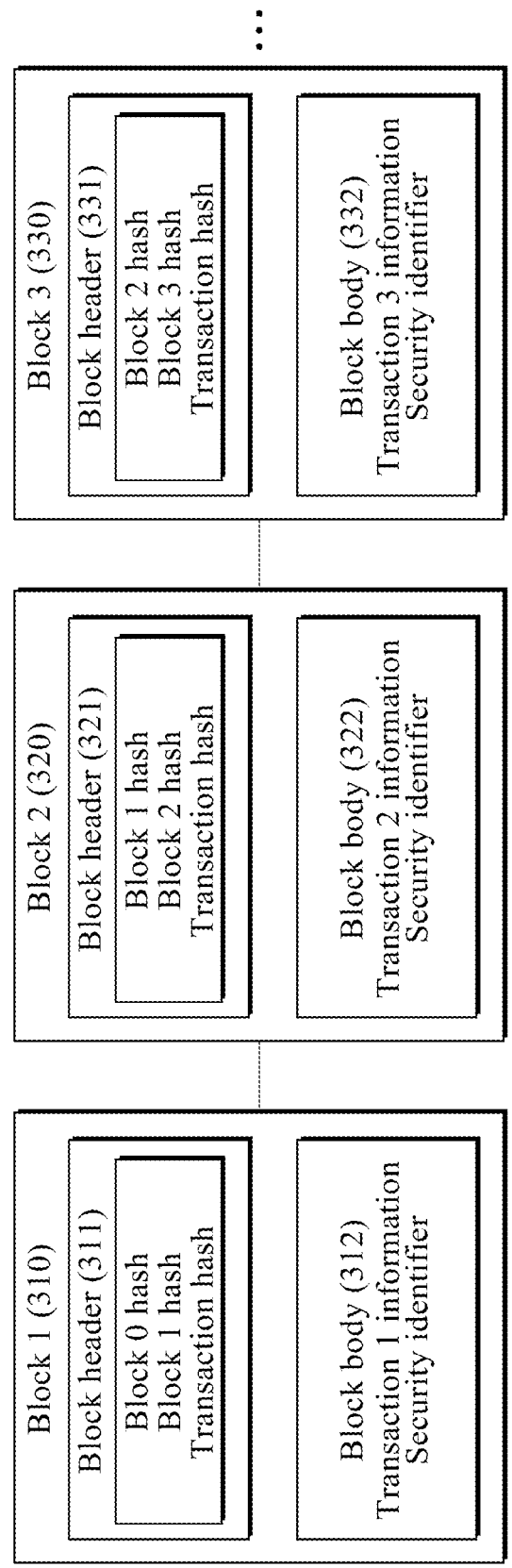
FIG. 11 is an exemplary diagram illustrating a block according to an embodiment of the present disclosure.

FIG. 10 is a block diagram illustrating a plurality of nodes of the blockchain system of the present disclosure. FIG. 11 is an exemplary diagram illustrating a block according to an embodiment of the present disclosure. Block 1 310, block 2 320, and block 3 330 illustrated in FIG. 11 may have a sequentially connected blockchain structure.

Referring to FIGS. 10 and 11, the node 200 included in the blockchain system according to an embodiment of the present disclosure may include a control module 210, an electronic document management and distribution module 220, and an electronic document division module 230, a block generation module 240, a communication module 250, a memory 260, and an input and output module 270.

In an embodiment, the control module 210 may be a component for overall control of the node 200. Specifically, the control module 210 may control the overall operation of the node 200 by using various programs stored in the memory 260 of the node 200. The control module 210 may control the node 200 to generate data through an application stored in the memory 260.

In an embodiment, the electronic document management and distribution module 220 may be consensus or signed in the blockchain system 100, or may be distributed to a plurality of nodes 20 without consensus or signature.

In an embodiment, the electronic document management and distribution module 220 may operate based on a smart contract. Smart contract is a concept that allows each node to automatically transact with each other in a blockchain. According to the present disclosure, an electronic document format that enables electronic document information to be viewed in the form of a document file may be distributed and stored in each node in the form of a distributed application program, where the distributed application program may be composed of its own executable code (smart contract) defining the function of the application program. Accordingly, since the distributed application program related to the electronic document format is distributed and stored in a plurality of nodes, electronic document information may be automatically combined with the form at the node, and this automatic merging operation may mean a smart contract.

In an embodiment, the electronic document management and distribution module 220 may include an interface capable of executing a distributed application program related to an electronic document format outside of the blockchain system 100 and various electronic document formats. In addition, the electronic document management and distribution module 220 may extract the condition for merging the electronic document format and the electronic document information from the first divided data to be described below or store the same in advance by itself. In addition, the electronic document management and distribution module 220 may merge the first divided data corresponding to the electronic document format to be described below and the second divided data corresponding to the electronic document information according to the merging condition. The procedure for merging the electronic document format and electronic document information may include various method such as placing the information of the electronic document in a designated space of the electronic document format according to given conditions, displaying the result of calculation and combination of data included in the electronic document information, or adding an electronic document format according to the size and quantity of electronic document information.

In an embodiment, the electronic document division module 230 may divide the electronic document into first divided data and second divided data. Herein, the first divided data may include an electronic document format, a merging condition, and various conditions related to the use of an electronic document. Herein, the second divided data may include electronic document information and an identifier.

In an embodiment, the block generation module 240 may generate a block, including the second divided data.

More specifically, referring to FIG. 11, in an embodiment, each block connected to a blockchain includes transaction details within a certain period, that is, transactions. The nodes 20 manage transactions by generating, storing, or verifying a blockchain according to their respective roles.

In an embodiment, a transaction may represent various types of transactions. For example, a transaction may correspond to a financial transaction to indicate the ownership of virtual currency and its fluctuations. In addition, in another example, a transaction may correspond to a cash transaction to indicate the ownership of an object and its fluctuations. The nodes that perform transactions in the decentralized network 10 may have a private key and a public key pair each having a cryptographic association relation.

In an embodiment, the blockchain described in the present disclosure may be a kind of distributed database of one or more blocks sequentially connected. Blockchain is used to store and manage the transaction details of users in a blockchain system, and each node participating in the blockchain network 10 generates a block and connects the same to the blockchain. For example, blocks 1 to 3 illustrated in FIG. 11 may be a portion of blocks of a blockchain that are sequentially connected. Although a limited number of blocks are shown in FIG. 11, the number of blocks that may be included in the blockchain is not limited thereto.

In an embodiment, each block included in a blockchain may be configured to include a block header and a block body. The block header may include a hash value of a previous block to indicate a connection relation between blocks. In the process of verifying whether the blockchain is valid, the connection relation in the block header may be used. The block body may include data stored and managed in the block, for example, transaction information, a transaction list, or a transaction chain.

In an embodiment, the block header may include a hash value of a previous block, a hash value of a current block, a hash value of a sub-block, a hash value of a transaction, and a nonce.

In an embodiment, the blockchain may include a plurality of connected blocks. A plurality of blocks may be connected based on a hash value in the block header. A hash value for the block immediately preceding the hash value of the previous block included in the block header may be the same value as the current hash value included in the previous block. A plurality of blocks may be connected in a chain by a hash value of a previous block in each block header. The nodes 20 participating in the decentralized network 10 verify the validity of the block based on the hash value of the previous block included in one or more blocks, and thus it may be impossible for a single malicious node to forge or alter the contents of an already generated block.

In an embodiment, the block body may include transaction information, a transaction list, or a transaction chain. The transaction information may be information related to a transaction of various forms generated in the transaction.

The transaction list may be a list of blockchain-based transactions. For example, the transaction list may contain records of financial transactions made in a blockchain-based financial system. The transaction list may be expressed in the form of a tree. For example, the amount transmitted by user A to user B is recorded in the form of a list, and the storage length in the block may be increased or decreased based on the number of transactions included in the current block.

In an embodiment, for example, block 1 310 may include a block header 311 and a block body 312. The block header 311 may include a previous block hash value (Block 0 hash), a current block hash value (Block 1 hash), and a transaction hash value (Transaction hash). The block body 312 may include transaction 1 information and a security identifier. Herein, the transaction 1 information may include second divided data of an electronic document. Since the description of the block 2 320 and the block 3 330 is the same as that of the block 1 310, the description thereof will be omitted.

In an embodiment, the communication module 250 may transmit and receive data through a communication connection between the node 200 and other nodes or external devices. The communication module 250 may be configured to communicate with various types of external devices according to various types of communication methods. For example, the communication module 250 may be a short-distance communication module (for example, Bluetooth, WiFi direct, or IrDA (infrared data association)) or a long-distance communication module (for example, a cellular network, the Internet, or a computer network (for example, LAN or WAN)).

In an embodiment, the memory 260 may store all data related to execution of various commands by the node 200. In addition, the memory 260 may store various data for the overall operation of the node 200 such as a program for processing or controlling the control module 210.

In an embodiment, the input and output module 270 may include a device for receiving an input of a user and a device for outputting an image or sound. For example, the input and output module 270 may include a touch screen, a mouse, a keyboard, a display, and a speaker.

Each of the methods of the present disclosure, which will be described with reference to FIGS. 12 to 14 below, may be performed by any one node among the plurality of nodes 20 included in the blockchain network 10. In addition, an operation of dividing an electronic document, an operation of generating a block, and an operation of merging data may be performed by any one node or may be performed by each different node.

Figure 12:
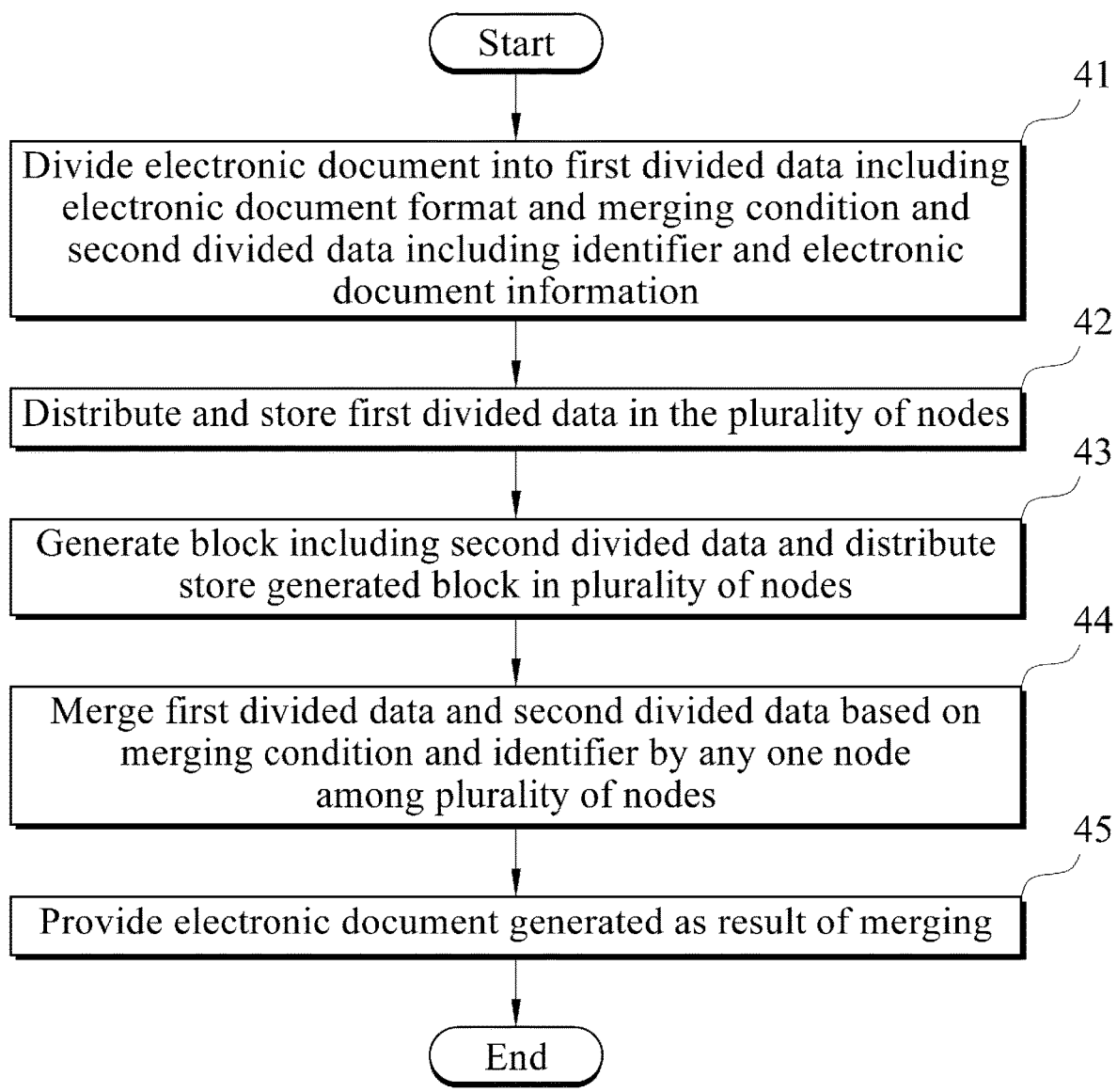
FIG. 12 is a flowchart illustrating a method for distributing an electronic document using a smart contract in a blockchain according to an embodiment of the present disclosure.

FIG. 12 is a flowchart illustrating a method for distributing an electronic document in a blockchain according to an embodiment of the present disclosure. The operations of FIG. 12 may be performed by the node 200 illustrated in FIG. 10.

Referring to FIG. 12, in an embodiment, in operation 41, the node 200 may divide an electronic document into first divided data, including an electronic document format and a merging condition and second divided data, including an identifier and electronic document information. Herein, the first divided data may include an electronic document format, a merging condition, and various conditions related to the use of an electronic document. Herein, the second divided data may include electronic document information, an identifier, and a chained address. For example, the electronic document information may include various contents included in an electronic document, and the identifier may be a tag capable of identifying an electronic document format included in the first divided data.

In an embodiment, in operation 42, the node 200 may distribute and store the first divided data in the plurality of nodes 20. For example, the plurality of nodes 20 may manage the first divided data in the form of a distributed application program (smart contract).

Specifically, smart contract is a concept that allows each node to automatically transact with each other in a blockchain. According to the present disclosure, an electronic document format that enables electronic document information to be viewed in the form of a document file may be distributed and stored in each node in the form of a distributed application program, where the distributed application program may be composed of its own executable code (smart contract) defining the function of the application program. Accordingly, since the distributed application program related to the electronic document format is distributed and stored in a plurality of nodes, electronic document information may be automatically combined with the form at the node, and this automatic merging operation may mean a smart contract.

In an embodiment, in operation 43, the node 200 may generate a block, including the second divided data and distribute and store the same in the plurality of nodes 20. For example, as illustrated in FIG. 11, the block may include the second divided data in a block body. In addition, when personal information is included in an electronic document, the block may further include a security identifier. The security identifier may include at least one of an issue number, a content of the electronic document, a resident registration number, and an address included in the electronic document.

In an embodiment, in operation 44, the node 200 may merge the first divided data and the second divided data based on the merging condition and the identifier. For example, the method of merging is configured to place the electronic document information in a designated space of the electronic document format, display the result of calculation and combination based on the electronic document information, or add another electronic document format according to the size and quantity of the electronic document information. More specific details will be described later with reference to FIGS. 13 and 14.

In an embodiment, in operation 45, the node 200 may provide an electronic document generated as a result of merging. For example, the node 200 may display an electronic document through the input and output module 270.

As the electronic document is provided in a blockchain as described above, the present disclosure can efficiently manage the storage space of the blockchain.

Figure 13:
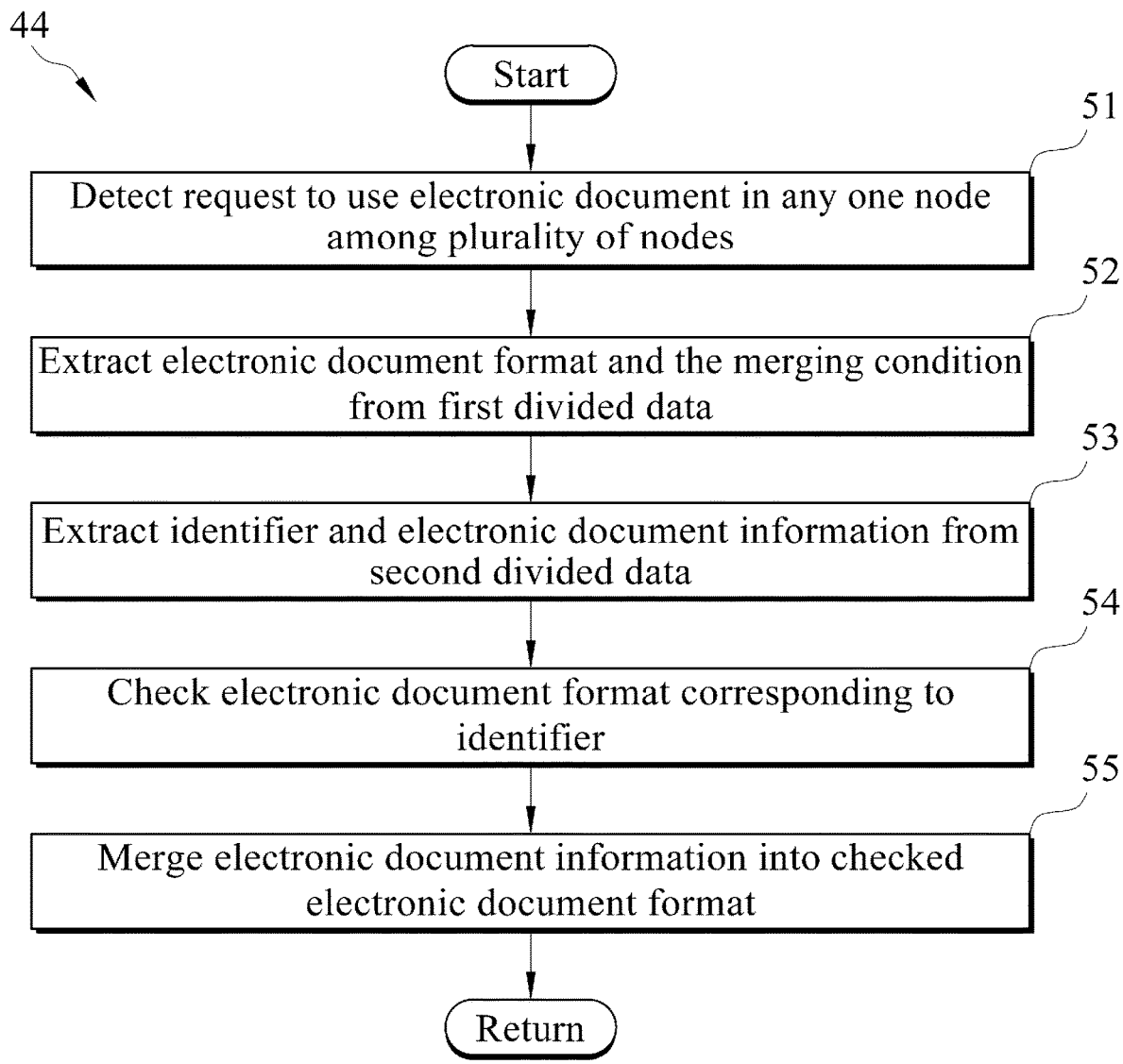
FIG. 13 is an exemplary diagram illustrating a method of merging divided electronic documents in a blockchain according to an embodiment of the present disclosure.

FIG. 13 is an exemplary diagram illustrating a method of merging divided electronic documents in a blockchain according to an embodiment of the present disclosure. The operations of FIG. 5 may be operations in which operation 44 of FIG. 12 is embodied. The operations of FIG. 5 may be performed by the node 200 illustrated in FIG. 10.

Referring to FIG. 13, in an embodiment, in operation 51, the node 200 may detect a request to use an electronic document from a user using the input and output module 270.

In an embodiment, in operation 52, the node 200 may extract an electronic document format and a merging condition from the first divided data using the electronic document management and distribution module 220.

In an embodiment, in operation 53, the node 200 may extract an identifier and electronic document information from the second divided data using the electronic document management and distribution module 220.

In an embodiment, in operation 54, the node 200 may check an electronic document format corresponding to the identifier using the electronic document management and distribution module 220.

In an embodiment, in operation 55, the node 200 may automatically merge the electronic document information into the electronic document format checked using the electronic document management and distribution module 220.

As described above, the present disclosure can provide an electronic document by automatically merging an electronic document format and electronic document information in response to a user's request to use an electronic document.

FIG. 14 is a flowchart illustrating a method of merging electronic documents including personal information in a blockchain according to an embodiment of the present disclosure. The operations of FIG. 14 may be operations in which operation 44 of FIG. 12 is embodied. The operations of FIG. 14 may be performed by the node 200 illustrated in FIG. 10.

Referring to FIG. 14, in an embodiment, in operation 61, the node 200 may detect a request to use an electronic document including personal information from a user using the input and output module 270. For example, the personal information may include a resident registration number, address, personal history, and the like.

In an embodiment, in operation 62, the node 200 may extract an electronic document format and merging condition from the first divided data using the electronic document management and distribution module 220.

In an embodiment, in operation 63, the node 200 may extract an identifier, electronic document information, and a security identifier from the second divided data using the electronic document management and distribution module 220. For example, the security identifier may include at least one of an issue number, a content of the electronic document, a resident registration number, and an address included in the electronic document.

In an embodiment, in operation 64, the node 200 may request input of a security text using the electronic document management and distribution module 220 in response to a request to use an electronic document including personal information. For example, the security text may be an issue number or a resident registration number included in an electronic document.

In an embodiment, in operation 65, the node 200 may compare the input security text and the security identifier using the electronic document management and distribution module 220.

In an embodiment, in operation 66, when the security text and the security identifier are the same as a result of comparison, the node 200 may use the electronic document management and distribution module 220 to check the electronic document format corresponding to the identifier.

In an embodiment, in operation 67, the node 200 may merge the electronic document information into the electronic document format checked using the electronic document management and distribution module 220.

As the electronic document is provided in the blockchain as described above, the present disclosure can increase the reliability of the blockchain by verifying the electronic document access qualification at the time of application for electronic document use.

A method for distributing an electronic document using a smart contract in a blockchain including a plurality of nodes according to an embodiment of the present disclosure may include: dividing the electronic document into first divided data, including an electronic document format and a merging condition and second divided data, including an identifier and electronic document information; distributing and storing the first divided data in the plurality of nodes; generating a block, including the second divided data and distributing and storing the generated block in the plurality of nodes; and merging the first divided data and the second divided data based on the merging condition and the identifier by any one node among the plurality of nodes.

According to various embodiments, the method may further include managing, with the plurality of nodes, the first divided data in the form of a distributed application program.

According to various embodiments, the plurality of nodes may include an electronic document management and distribution module.

According to various embodiments, the merging may include: detecting a request to use an electronic document in any one node among the plurality of nodes; extracting the electronic document format and the merging condition from the first divided data using the electronic document management and distribution module; extracting the identifier and the electronic document information from the second divided data using the electronic document management and distribution module; checking the electronic document format corresponding to the identifier using the electronic document management and distribution module; and merging the electronic document information into the checked electronic document format using the electronic document management and distribution module.

According to various embodiments, the method may further include providing an electronic document generated as a result of the merging.

According to various embodiments, the method may further include when personal information is included in the electronic document, adding a security identifier to a block, including the second divided data.

According to various embodiments, the security identifier may include at least one of an issue number, a content of the electronic document, a resident registration number, and an address included in the electronic document.

According to various embodiments, the merging may include: detecting a request to use an electronic document including personal information in any one node among the plurality of nodes; extracting the electronic document format and the merging condition from the first divided data using the electronic document management and distribution module; extracting the identifier, the electronic document information, and a security identifier from the second divided data using the electronic document management and distribution module; requesting input of a security text in response to a request for using an electronic document including the personal information using the electronic document management and distribution module; and comparing the input security text with the security identifier using the electronic document management and distribution module.

According to various embodiments, the method may further include: when the security text and the security identifier are the same as a result of the comparison, checking the electronic document format corresponding to the identifier using the electronic document management and distribution module; and merging the electronic document information into the checked electronic document format using the electronic document management and distribution module.

In a system for distributing an electronic document using a smart contract in a blockchain, the plurality of nodes may include an electronic document management and distribution module, an electronic document division module, a block generation module, and a memory. Using the electronic document division module, any one node among the plurality of nodes may divide the electronic document into first divided data, including an electronic document format and a merging condition and second divided data, including an identifier and electronic document information, and the any one node may distribute and store the first divided data in the plurality of nodes. Using the block generation module, any one node may generate a block, including the second divided data and distribute and store the generated block in the plurality of nodes. Using the electronic document management and distribution module, any one node among the plurality of nodes may merge the first divided data and the second divided data based on the merging condition and the identifier.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

The invention claimed is:

1. A method for sharing and verifying blocks between specific nodes, among a plurality of nodes included in a blockchain, the method comprising:
   generating, with at least one first node among the plurality of nodes, at least one transaction including identification information and transaction information of the specific nodes;
   generating, with at least one second node among the plurality of nodes, at least one main block, including both a block header and a block body based on the identification information and the transaction information;
   generating, with the at least one second node among the plurality of nodes, at least one sub-block, including only a block header based on the identification information and the transaction information; and
   differentially sharing, with the at least one second node, the generated at least one main block or sub-block with the specific nodes based on the identification information and remaining nodes, except for the specific nodes,
   wherein the generating of the at least one sub-block comprises:
   after the generating of the at least one main block is completed, extracting a header of the generated at least one main block with the at least one second node; and
   generating, with the at least one second node, at least one sub-block, including only the header of the extracted block, and
   wherein the differentially sharing the block with the specific nodes and remaining nodes, except for the specific nodes, further comprises:
   sharing, with the at least one second node, the generated at least one main block, including both a block header and a block body with the specific nodes among the plurality of nodes; and sharing, with the at least one second node, the generated at least one sub-block, including only a block header with the remaining nodes, except for the specific nodes, among the plurality of nodes.

2. The method of claim 1, wherein the generating of the at least one main block comprises:
checking, with the at least one second node, transactions, among the at least one transaction, having the same identification information;
generating, with the at least one second node, a main block, including only transactions having the same identification information; and
sharing, with the at least one second node, the main block, including only transactions having the same identification information with specific nodes corresponding to the same identification information.

3. The method of claim 1, further comprising: storing and managing, with the at least one second node, the generated at least one main block.

4. The method of claim 1, wherein:
the at least one sub-block comprises a block hash value; and
the method further comprises verifying, with the remaining nodes, integrity of the at least one sub-block using the block hash value.

5. The method of claim 4, further comprising:
requesting, with at least one node among the remaining nodes, a transaction hash value corresponding to the at least one sub-block from the at least one second node;
calculating, with the at least one second node, the requested transaction hash value;
transmitting, with the at least one second node, the calculated transaction hash value to the at least one node; and
comparing, with the at least one node, the received transaction hash value with the previously stored transaction hash value; and
verifying the integrity of the transaction information included in the sub-block based on the comparison result.

6. The method of claim 1, further comprising storing and managing, with the plurality of nodes, at least one main block, including both the block header and the block body and at least one sub-block, including only the block header as same block.

7. A method for distributing an electronic document using a smart contract in a blockchain including a plurality of nodes, the method comprising:
dividing the electronic document into first divided data, including an electronic document format and a merging condition and second divided data, including an identifier and electronic document information;
distributing and storing the first divided data in the plurality of nodes;
generating a block, including the second divided data and distributing and storing the generated block in the plurality of nodes; and
merging the first divided data and the second divided data based on the merging condition and the identifier by any one node among the plurality of nodes, wherein:
the plurality of nodes comprises an electronic document management and distribution module, and
the merging comprises:
detecting a request to use an electronic document in any one node among the plurality of nodes;
extracting the electronic document format and the merging condition from the first divided data using the electronic document management and distribution module;
extracting the identifier and the electronic document information from the second divided data using the electronic document management and distribution module;
checking the electronic document format corresponding to the identifier using the electronic document management and distribution module; and
merging the electronic document information into the checked electronic document format using the electronic document management and distribution module.

8. The method of claim 7, further comprising: managing, with the plurality of nodes, the first divided data in the form of a distributed application program.

9. The method of claim 7, further comprising: providing the electronic document generated as the result of merging.

10. The method of claim 7, further comprising: when personal information is included in the electronic document, adding a security identifier to a block, including the second divided data,
wherein the security identifier includes at least one of an issue number, a content of the electronic document, a resident registration number, and an address included in the electronic document.

11. The method of claim 7, wherein the merging comprises:
detecting a request to use an electronic document including personal information in any one node among the plurality of nodes;
extracting the electronic document format and the merging condition from the first divided data using the electronic document management and distribution module;
extracting the identifier, the electronic document information, and a security identifier from the second divided data using the electronic document management and distribution module;
requesting input of a security text in response to a request for using an electronic document including the personal information using the electronic document management and distribution module; and
comparing the input security text with the security identifier using the electronic document management and distribution module,
wherein the method further comprises:
checking the electronic document format in response to the identifier using the electronic document management and distribution module when the security text and the security identifier are the same; and
merging the electronic document information into the checked electronic document format using the electronic document management and distribution module.

12. A system for distributing an electronic document using a smart contract in a blockchain comprising a plurality of nodes,
wherein the plurality of nodes comprises an electronic document management and distribution module, an electronic document division module, a block generation module, and a memory;
wherein:
by using the electronic document division module, any one node among the plurality of nodes divides the electronic document into first divided data, including an electronic document format and a merging condition and second divided data, including an identifier and electronic document information;

the any one node distributes and stores the first divided data in the plurality of nodes;

by using the block generation module, the any one node generates a block, including the second divided data and distributes and stores the generated block in the plurality of nodes; and by using the electronic document management and distribution module, any one node among the plurality of nodes merges the first divided data and the second divided data based on the merging condition and the identifier, and wherein the merging of the first divided data and the second divided data is performed by:

detecting a request to use an electronic document in any one node among the plurality of nodes;

extracting the electronic document format and the merging condition from the first divided data using the electronic document management and distribution module;

extracting the identifier and the electronic document information from the second divided data using the electronic document management and distribution module;

checking the electronic document format corresponding to the identifier using the electronic document management and distribution module; and merging the electronic document information into the checked electronic document format using the electronic document management and distribution module.

* * * * *